(12) United States Patent
Dbjay

(10) Patent No.: US 6,834,960 B2
(45) Date of Patent: Dec. 28, 2004

(54) PHOTOGRAPHING SYSTEM FOR PRODUCING VR EDITING

(76) Inventor: Jean-Michel Dbjay, 8A, rue des Fauvettes, Montauban (FR), 82000

( * ) Notice: Subject to any disclaimer, the term of this patent is extended or adjusted under 35 U.S.C. 154(b) by 0 days.

(21) Appl. No.: 10/380,207
(22) PCT Filed: Sep. 13, 2001
(86) PCT No.: PCT/FR01/02839
§ 371 (c)(1), (2), (4) Date: Sep. 9, 2003
(87) PCT Pub. No.: WO02/23265
PCT Pub. Date: Mar. 21, 2002

(65) Prior Publication Data
US 2004/0036841 A1 Feb. 26, 2004

(30) Foreign Application Priority Data
Sep. 13, 2000 (FR) .................. 00 11669

(51) Int. Cl.$^7$ .................. G03B 21/00; G03B 15/00
(52) U.S. Cl. .................. 352/243; 352/53; 352/86; 396/5
(58) Field of Search .................. 396/1, 5, 322, 396/323, 419, 428; 352/43, 53, 243

(56) References Cited

U.S. PATENT DOCUMENTS

| | | |
|---|---|---|
| 3,688,676 A | 9/1972 | Cruickshank |
| 4,158,487 A * | 6/1979 | Collender .................. 352/38 |
| 5,282,029 A | 1/1994 | Lawrence et al. |
| 5,857,119 A | 1/1999 | Borden |

OTHER PUBLICATIONS

Kaidan, Immersive Imaging Technology, Dec. 12, 1997.*

* cited by examiner

Primary Examiner—David Gray
Assistant Examiner—Arthur A Smith
(74) Attorney, Agent, or Firm—Young & Thompson

(57) ABSTRACT

This device for taking spherical pictures of a scene comprising a support (1, 2) provided with securement means (3) for a picture taking apparatus.

This support can be on the one hand relatively rotatable about a substantially vertical axis (12) relative to the photographed scene and on the other hand the securement means (3) being movable in rotation relative to a substantially horizontal axis.

Moreover, it is provided with means (1) permitting suspending it above the scene to be photographed. This suspended device can also comprise a support (1, 2) provided with securement means (17) for several photographic devices, these devices being adapted to be all oriented toward a point on the scene to be photographed and the support (1, 2) being adapted to be relatively rotatable about a substantially vertical axis (12) relative to the scene to be photographed.

26 Claims, 14 Drawing Sheets

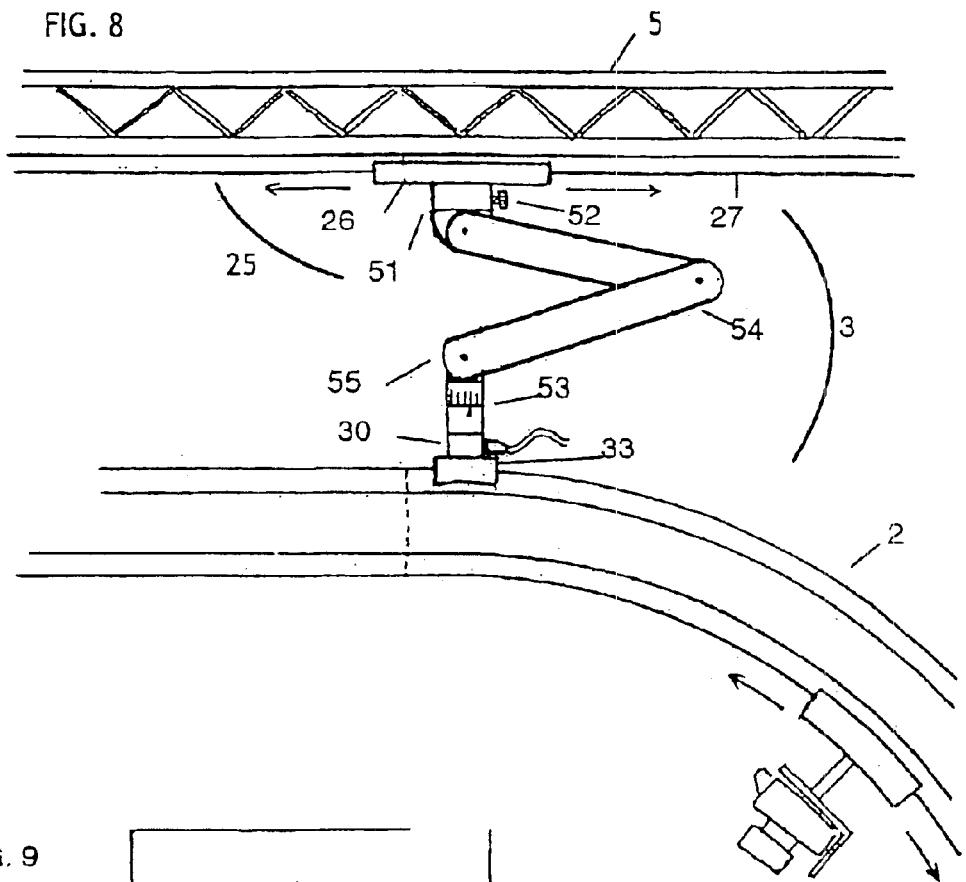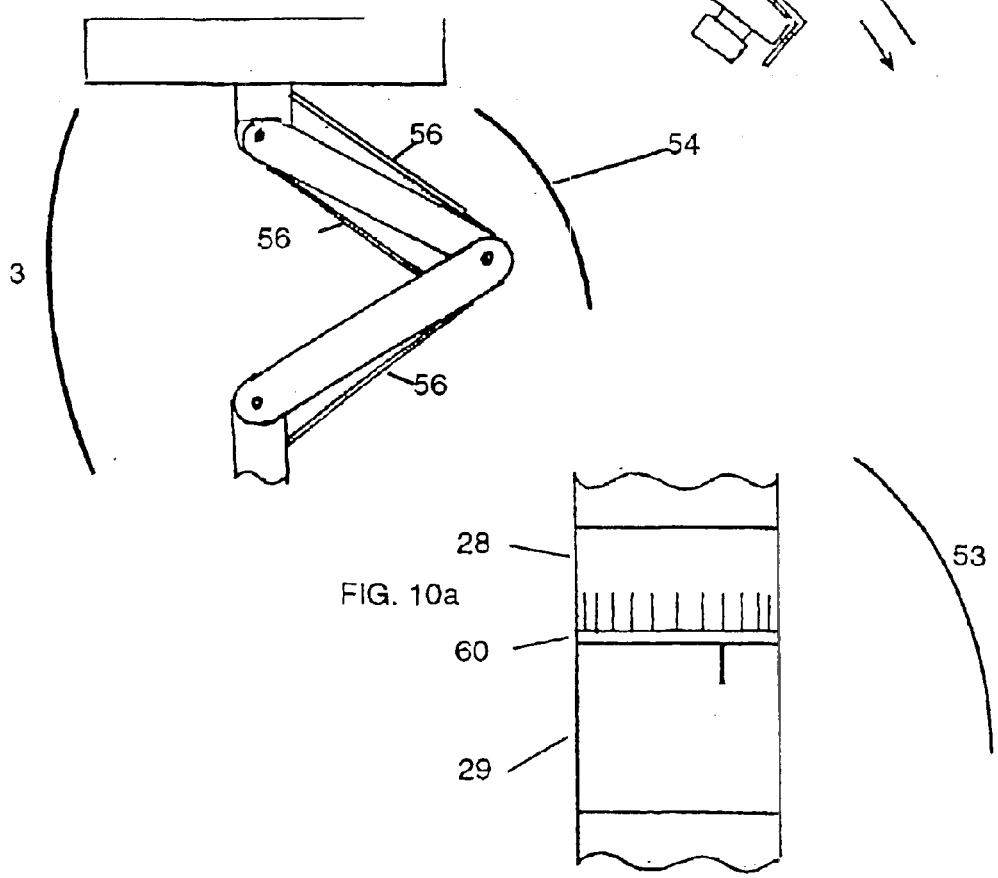

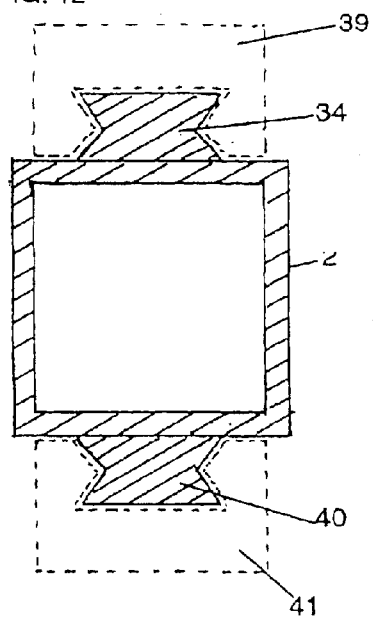
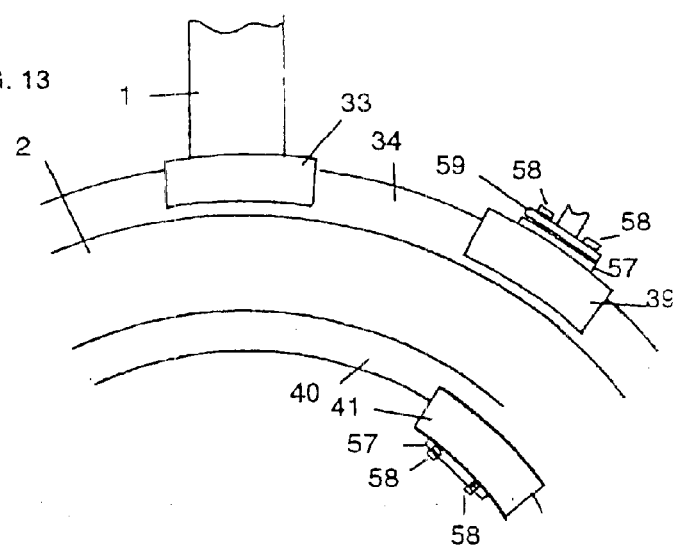
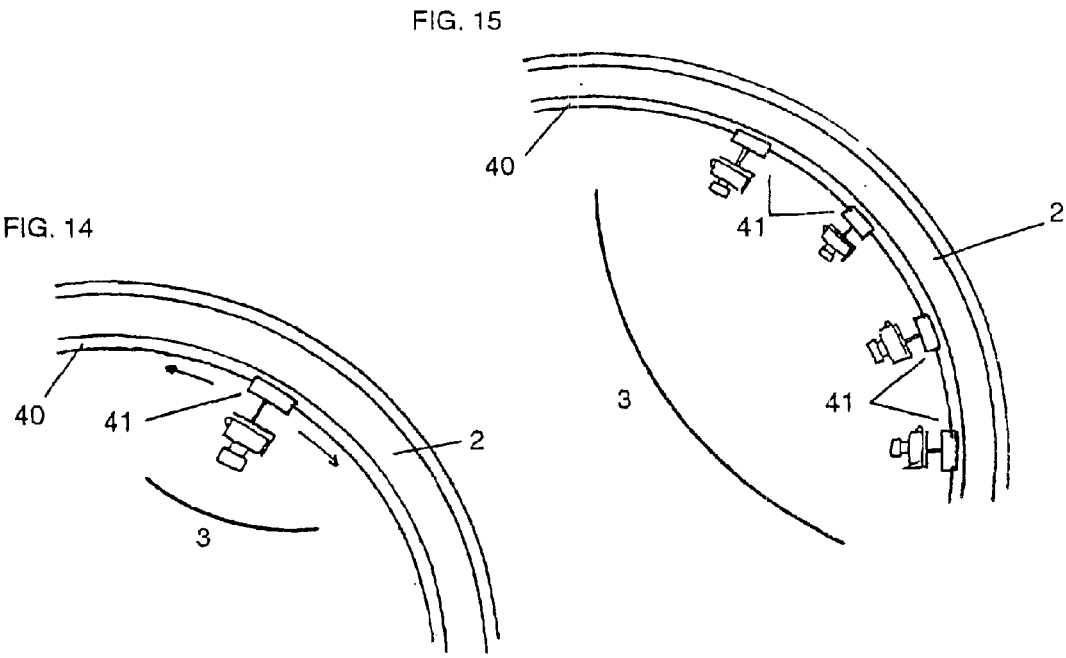

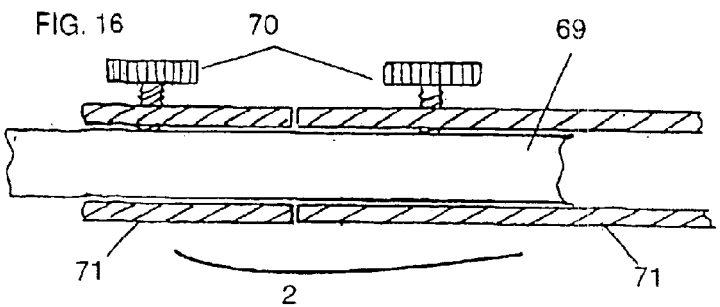
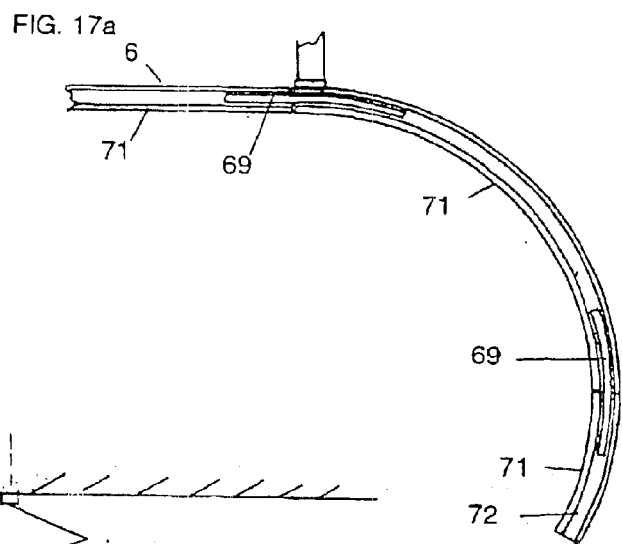
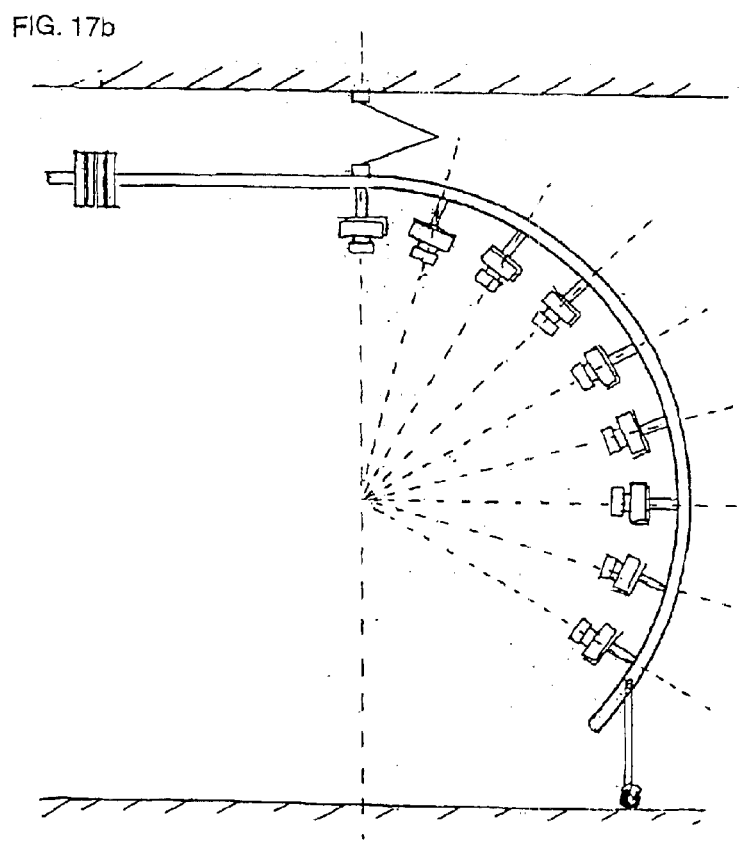

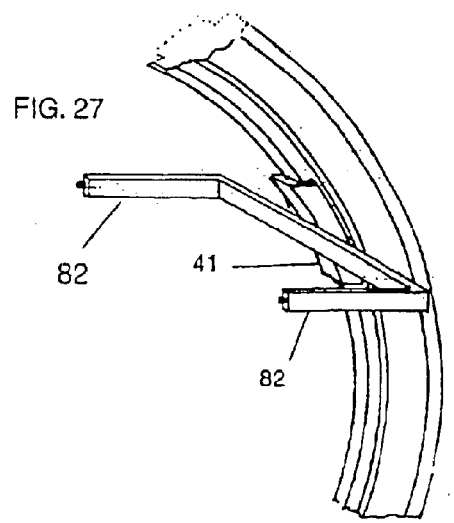
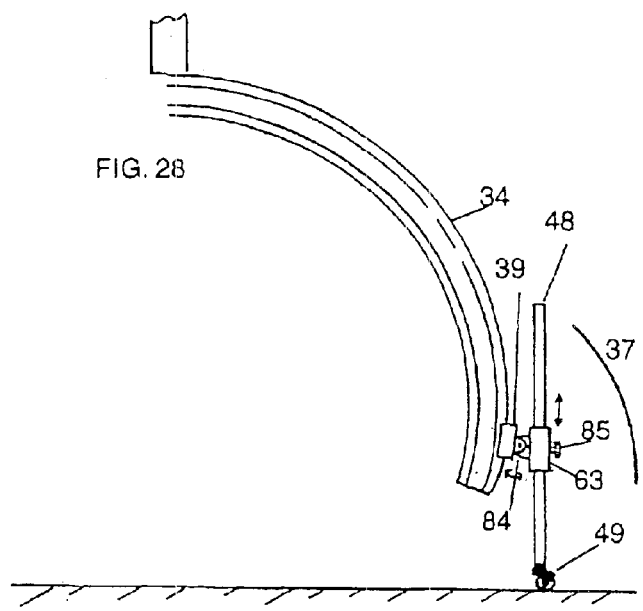
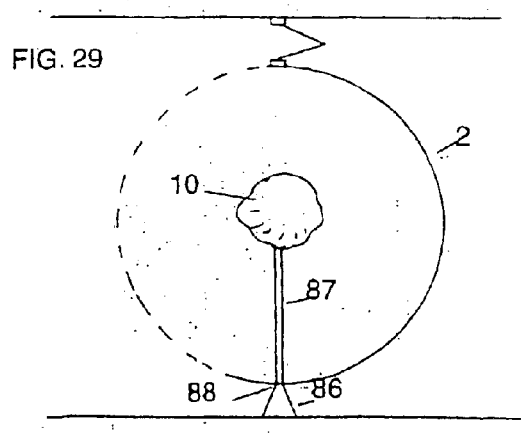
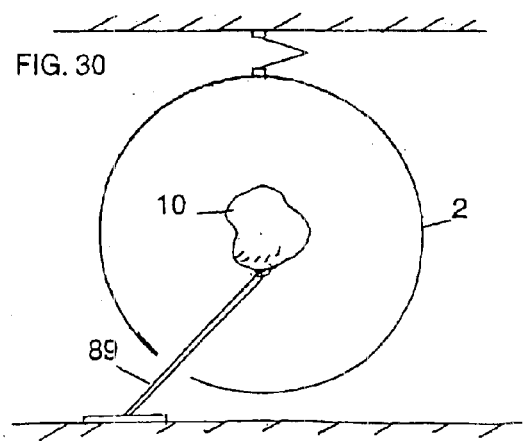

PHOTOGRAPHING SYSTEM FOR PRODUCING VR EDITING

The present invention relates to a device for taking three-dimensional views, that can be adapted more particularly to the production of VR (Virtual Reality) editions. VR editing is a computer process according to which the shots are subjected to digital processing for their visualization on a computer with the help of visualization or "viewer" software, which gives the illusion of a three-dimensional representation of the photographed reality. These three-dimensional editions are thus constructed from real photographic images, which distinguishes them from 3D digital images called synthesis images. It is a recent technique, the first VR presentations dating from the 1990s.

At present, there are known two types of VR editing: panoramic and object.

Panoramic VR is a digital representation in three dimensions of a space which is visualized on a computer screen and with which one can interact with the help of visualization or "viewer" software which simulates an immersion and a development in this space. Panoramic VR is constructed from a fixed panoramic image of the represented space. This panoramic image can cover up to 360° by 360° for spherical visualization of the space. This panoramic image can be digitally processed so as to be visualized in three dimensions with the help of visualization software.

The mechanical means for taking shots used to produce a panorama is a panoramic head. This panoramic head is a rotatable support for apparatus for taking views, permitting being able to pivot the apparatus about an axis passing through the nodal point of the object. In general, the panoramic head is graduated or notched such that the apparatus can be placed in position with sufficient precision for each shot.

The VR object is a digital representation in three dimensions of an object which is visualized on a computer and with which one can interact to manipulate it with the help of so-called "viewer" software. The VR object is constructed from a spherical series of shots of an object, namely a series of shots taken at multiple angles of view of the object. These shots are digitally processed and compiled in a single file. The user can manipulate and see the object up to 360° by 360°.

At present, the mechanical means commonly used for taking the three-dimensional views necessary for the production of a VR object, is an object rig. FIGS. 36 and 37 show two examples of object rigs. This equipment is comprised by two elements:

- a turning support 102 on which the object rests, combined with
- a support 103 for the view-taking apparatus. This support for the apparatus for taking views permits placing the view-taking apparatus in several positions along a regular curve about the arc of a circle (or an elliptical arc) and the objective of the apparatus is oriented, no matter what its position along the curve, toward a focal point located on the axis of rotation of the photographed object.

This apparatus support is generally comprised by a vertically oscillating arm 102, fixed to a base fixed to the floor; said oscillating arm carries and drives the view-taking apparatus along a rod such that its objective will always be turned toward a focal point located on the virtual axis of rotation of the object. The combination of the horizontally rotating movement of the object on its rotatable plate and of the vertical rotating movement of the view-taking apparatus on the oscillating arm, permits taking shots over all the horizontal and vertical angles defined for the production and compilation of the VR file. There are also found such supports in the form of a curved arm fixed to the floor, which arm is provided with a movable securement system for photographic apparatus which permits, by moving it along the curved arm, giving the vertical movement of rotation and inclination to the apparatus.

It will be seen that the construction of a VR object photographed with the help of this equipment has numerous drawbacks:

- the object must be held such that it can turn about itself, it is thus necessarily disassociated from its environment.
- as a result of this, to have a correct representation of the VR object, it is necessary to isolate the object from all the original shots before compilation, so as to avoid showing the rotating support and the fixed environment of the object. This manipulation is laborious.

The device according to the invention has for its object to overcome these drawbacks and to propose a system to produce a third type of VR images based on digital editions called VR objects.

To this end, the device according to the invention proposes combining the effects of panoramic VR shots with the effects of object VR shots, and, moreover, it is provided to permit the user if desired simultaneously to use several view-taking devices.

The invention thus proposes a device for producing spherical shots of a scene comprising a support provided with securement means for the photographic apparatus, this support being adapted to be in movement of relative rotation about a substantially vertical axis relative to the photographed scene, and on the other hand the securement means being movable in rotation relative to a substantially horizontal axis, characterized in that it is provided with means permitting suspending it above the scene to be photographed.

It also proposes a device for the production of spherical photographs of a scene, characterized in that it comprises a support provided with securement means for several view-taking devices, these devices being adapted to all be directed toward a point on the scene to be photographed and the support being adapted to move in relative rotation about a substantially vertical axis relative to the photographed scene, and in that it is provided with means permitting suspending it above the scene to be photographed.

Thus the present invention proposes an equipment-object apparatus support suspended at at least one point above the scene to be photographed and which does not rest fixedly on the floor. In a studio, for example, the object is placed in a turning plate, isolated from the rest of the view by natural partitions of its presentation. The view-taking system is immersed in the assembly of the environment without hindering the movement of rotation of the plate nor being affected by this rotative movement.

In one embodiment of the invention, the device is mounted pivotally about a vertical axis, the scene to be photographed remaining fixed. The assembly of the view-taking system thus turns about the object by means of a system of rotation. Thus, the apparatus support for the equipment-object is fixed to a point of rotation which is disposed above the object or the scene to be photographed. This system can be embodied in at least one carrying arm provided with a securement system for the photographic apparatus such that the shape of the arm combined with the shape of the components of the securement system, permits placing the apparatus used suitably for taking VR object shots.

The advantage of the point of rotation being disposed above the object is that the device according to the invention permits taking views of the object by turning the assembly of the view-taking system about the object without any structure of the system appearing in the photographic field. This was not possible with rotation guided from the floor.

The support has for example a carrying arm bent in substantially circular or elliptical arc shape, disposed in a vertical plane. In this case, the support if desired has a counterweight balancing the carrying arm relative to the suspension means.

In one embodiment, it can be provided that the securement means are movable along a guide rail in the form of an arc of a circle disposed in a vertical plane. In another embodiment, the securement means are mounted for example on an arm oscillating about a substantially horizontal axis, this arm being mounted on the support.

Preferably, the suspension means are also provided with means permitting varying the height and/or inclination of the device.

As the assembly of the device according to the invention can be of relatively great weight, it can be provided that the support has means for bearing on the floor.

A device according to the invention permits having a representation of the object and of the space in which it is located. As to this, there is a combination of the object VR effects and panorama VR effects. The viewing software thus permits moving about the object whilst seeing the panorama of the space which it surrounds unfold.

In addition to this substantial gain as to representation, the system according to the invention permits gains of productivity by avoiding the long work of moving about the photographed object.

Moreover, the device according to the invention permits if desired using simultaneously several photographic devices: time is thus saved during shooting, which permits the spherical photography of living models as well as gains in productivity.

It should be noted that there are already object VR editions shown in an environment. But these editions appear on only a single setting and the environments are added with the help of computer means and are provided with the help of synthetic images.

According to particular embodiments and additional developments of the invention:

As an additional development of the invention, the arm or arms are anchored to a support provided with a system of rotation permitting turning the system about a virtual axis passing through the focal point of the object VR camera. Thus it is the assembly of the photographic system which turns about the object.

In the case of movement of rotation of the securement means of a photographic apparatus relative to a substantially horizontal axis, this horizontal axis cuts the vertical axis of rotation of the device relative to the scene to be photographed at the focal point of the camera.

The support can be rigid, flexible or articulated. It can be adjustable in height so as to be able freely to adjust the position and the height of this photographic system. Without excluding other technical solutions, it can be simply a matter of a carrying axle ensuring both the role of support and the role of the element of the system of rotation, but it can also be a matter for example of a simple plate or an articulated end or telescopic arm.

The rotation system can be ensured as desired and without restriction by an axle, a pivot, a ball joint or a circular guide such as a disc or a rail . . . (this list is neither exhaustive nor exclusive). In the case of an axle, it will preferably be hollow to let pass all the necessary supply or connection wires.

The system of rotation of the arm can be provided with a system permitting giving another movement than a circular movement to the arm. For example, an arm provided with a cam.

The anchoring system of the arm can be fixed to at least one point on the arm or be movable along the arm. Without excluding other technical solutions, it can be a matter of one or several holes along the arm in which will be inserted an axle; it can also be a matter of a guide system permitting causing the arm to slide on the anchoring point of the support.

A system of indexing of any nature permitting placing the arm with sufficient precision (according to the requirements of the VR camera) in its rotational movement can complete the system. It can be as desired and without restriction a system of visual indexing (graduated angular sector . . . ), mechanical (with notches, disc with a stop . . . ), electrical, electronic . . . etc . . . .

The shape of the arm or arms is of no matter to the invention. Only the shape of the arm assembly and system for securement of the apparatus is to be taken into account. The assembly should be adapted such that one can pass with sufficient precision (according to the requirements of the object VR photographing system), to a profile view, a regular curve near an arc of a circle or an arc of an ellipse between each point corresponding to the nodal point of the objective or of the objectives of the apparatus at the different positions in which the apparatus is disposed in the course of the photographing sequence of the object. As a result, the arm can also be naturally formed in the arc of a circle, the arc of an ellipse, or else be of polygonal or rectilinear form (which list is not exhaustive and without restriction).

The extent of the sector covered by the arm and its securement system is free. It can be chosen to extend the arm on each side of its anchoring point to reduce by half the duration of photographing. One would thus if desired have recourse to a step of retouching the image so as to cause the elements of the system to disappear not allocated in the field if they are not masked by the photographed object.

What is most immediately apparent is an arm covering a sector of 90° but it could be up to 180°, for example a vertical half circle, or horizontal half circle, or even beyond to enclose on itself.

According to the same logic of reducing the duration of photographing, for example in the case of photographed subjects incapable of holding a pose (animals) the number of arms can be multiplied.

In its most common configuration, when the arm does not cover more than the sector of a vertical semicircle, it can be prolonged horizontally on the other side of its anchoring point in the rotation system. This prolongation thus serves to provide a possible counterweight to ensure the equilibrium of the system and to fix directly or by means of an extension arm, instruments in usage in the photographic field, for example lights, reflectors, background screens . . . and this without restriction.

Of course according to particular embodiments and particularly as a function of its size and its shape, the arm could be of a single piece or else comprised by several elements, if desired separately usable, and of changeable shape. For example, in the case of an arm covering a sector of a semicircle, it can be separated into two and of which only one portion need be used so as not to cover more than a quarter circle sector.

There can be proposed a complete set of arms of different sizes and/or shapes, to be used according to the objects to be photographed, according to the number of photographic devices that it is desired to use, according to the radius of rotation, according to the angular sector which it is desired to cover or the movement sought and/or also according to other considerations, and this without restriction.

The arm assembly and system of securement of the apparatus can be provided with an indexing system of any nature (visual, mechanical, with notches, electrical, electronic . . . this without restriction) adapted to facilitate the emplacement or movement of the element or elements of the securement system of the photographic apparatus along the arm. The most obvious indexing system is a graduation along the arm.

The securement system for the apparatus can be comprised by one or several elements movable along the arm or by several elements fixed on the arm or else by a combination of the two.

The movement of the movable element along the arm can be ensured without restriction by any known technical means (sliding element, carriage . . . or simply a removable element that can be fixed at several points along the arm).

The elements comprising the securement system can be flexible or articulated so as if desired to adjust the inclination of the photographic apparatus. They can be of different shape and length corelatively to the shape of the arm. They can be particularly of adjustable length to permit adjusting the distance of the apparatus to the object without zoom optics.

The securement system can also be comprised by at least one oscillating arm such as is found in use on object photographic equipment (object rigs) that are conventional. Even if its presentation is the object of a specific development, it is considered that such an oscillating arm is a simple variation of the system of securement of the apparatus. The junction of the oscillating arm and the arm is provided at at least one point of said arm by at least one system permitting rotation of the oscillating arm about an axis passing through a predetermined point located on the virtual axis of rotation of the system. This is such that the combination of the rotation of the arm and that of the oscillating arm will permit covering all of the azimuth and altitude angles defined for a sequence of spherical photography (object VR).

The arm-oscillating arm system can be provided with an indexing system for the angle of inclination of the oscillating arm.

The number of securement elements used in the securement system is not limited. It depends on the number of photographic devices that it is desired to use simultaneously and/or on the number of angles of inclination that are to be covered during VR photography.

The constituent elements of the securement system can be designed such that they can be adapted on the one hand to the positioning of the apparatus (countryside or portrait) and on the other hand to a large variety of photographic devices in existence, by permitting adjustment of their position. To this end, one could have recourse to any one of the technical solutions for adjustment in use of the material. For example, and without restriction, there could be an adjustable system in one or two planes, spherical joints, articulations, play adaptors . . . etc . . . .

In an additional development of the invention, the element or elements comprising the securement system can fix two photographic devices to obtain certain photographic effects such as relief photography. The position indices of these devices are thus: the axis of symmetry of the two objectives and the center of the segment formed by the nodal points of the objectives.

In an additional development of the invention, at least one support adapted to cause the arm to rest on the floor to contribute to its stability can be used. As a function of the shape of the arm, the floor support will take place either with the help of an element adapted to accompany the movement of the arm on the floor (for example a roller), or with the help of a pivot. The pivot is provided for the case of an arm covering at least one vertical semicircular sector. Such a support could, without excluding other technical solutions, be present in the form of a rod fixed to the arm and whose lower end is provided with a roller or with a pivot resting on the floor.

In an additional development of the invention, in the case of the use of an arm covering at least one vertical semicircular sector, a pivot serving as a support on the floor, prolonged by an axle passing through the arm at its base and at its intersection with the virtual axis of rotation of the system, arises vertically along this axis to serve as a support for the photographed object.

In an additional development of the invention, in the case of the use of an arm covering at least one vertical semicircular sector, which can extend up to a full circle, there can be added a support for the object which is fixed or which rests relative to the vertical axis of rotation of the arm such that it can hold the photographic object on the virtual axis of rotation of the system. This solution permits for example with a small retouching of the photograph, showing objects suspended in their environment.

In an additional development of the invention, the photographic system can be provided at the level of its support with a turning electrical collector or contact. This collector is adapted to supply or to control the photographic apparatus and the other means used by the photographer, such as lighting devices fixed on the arm, as well as to connect if desired automatic control mechanisms. This collector can be provided with as many channels as needed.

In an additional development of the invention, the system can be provided with one or several rigid extension arms, articulated or flexible, and adapted to be fixed on the arm to hold devices in use for taking photographs (lights, reflector panels, mirrors, etc . . . ).

In an additional development of the invention, a control system, which can be computerized if desired, is provided to drive the arm system in rotation.

In an additional development of the invention, a control system, which can be computerized if desired, is provided to cause the movements of at least one movable element of the securement system.

In the case of a system provided with an oscillating arm, a control system which if desired can be automated is provided to drive the oscillating arm.

In an additional development of the invention, a crosspiece, a brace support or a rolling bridge, if desirable adjustable in height, can support the assembly of the system. This is particularly valuable for use outside. The photos can thus be easily retouched with the help of graphical software to cause the support or supports to disappear.

In an additional development of the invention, the system can be held by any movable securement device (for example: suction cups, securement hooks).

In an additional development of the invention, there can be provided a partition space about the circle traced by the movement of rotation of the arm such that the photographed object and its decoration can be isolated. This partitioning can serve itself as a decorative element or as a support for the decorative elements.

The details and advantages of the present invention will become better apparent from the description which follows, given with reference to the accompanying schematic drawings, in which:

FIG. 8 shows a detailed view of the support with a portion of the arm of an element of the securement system of FIG. 7.

FIG. 9 shows a detailed view of the support of FIG. 7.

FIG. 10a shows in an enlarged view the rotatable head with the notches or stop disc of the support of FIG. 7.

FIG. 12 shows a cross-sectional view of the arm of FIG. 7.

FIG. 13 shows a view of the anchoring system of the arm at the base of the support.

FIG. 14 shows a view of the arm provided with a movable securement system.

FIG. 15 shows a view of the arm provided with a securement system comprised by several elements.

FIG. 16 shows in cross-section the junction system for the sections of the arm.

FIG. 17a shows in cross-section an arm comprised by three sections.

FIG. 17b shows a possible modification of the shape of the arm with the help of sections.

FIG. 27 shows a carriage on its rail.

FIG. 28 shows a floor support fixed on the arm by means of a carriage.

FIG. 29 shows a configuration in which the arm covers at least one sector of a vertical semicircle.

FIG. 30 shows another configuration of the arm.

Figure 1:
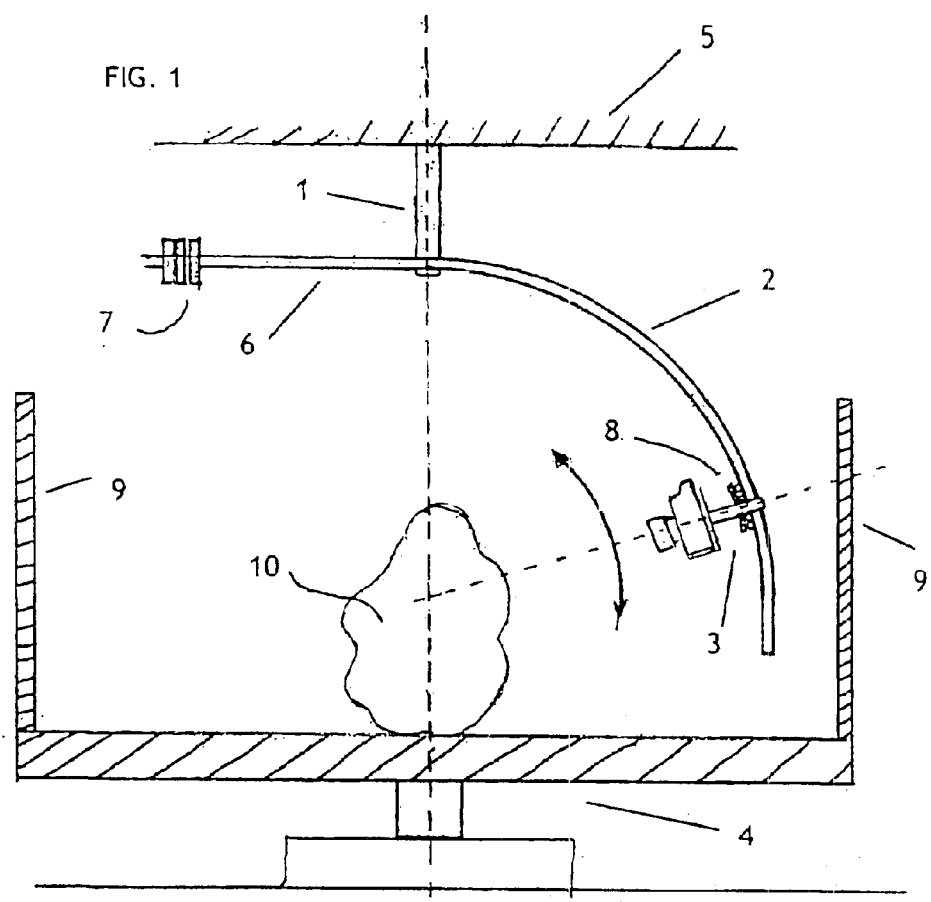
FIG. 1 shows a first embodiment of a photographic system according to the invention (cross-sectional view).

According to a first embodiment shown in FIG. 1, a securement or support 1 is fixed to a ceiling or a beam 5. Here, the support is not provided with a rotation system. On this support is anchored an arm 2 forming on the one hand a quarter of a circle and prolonged by another part horizontally on the other side of the support. On this prolongation 6 are two counterweights 7 ensuring the balance of the system. On this arm is located a securement system 3 for a photographic apparatus. This securement system is constituted by an element 8 movable along the arm. In this basic arrangement, the rotation of the arm not being ensured, the object to be photographed and its environment or decoration are disposed on a turning plate 4. The object assembly 10 and decoration is isolated from the rest of the studio by partitions 9 appearing in section. These partitions can serve as a support for the decoration or be an integral part of the decoration.

Figure 2A:
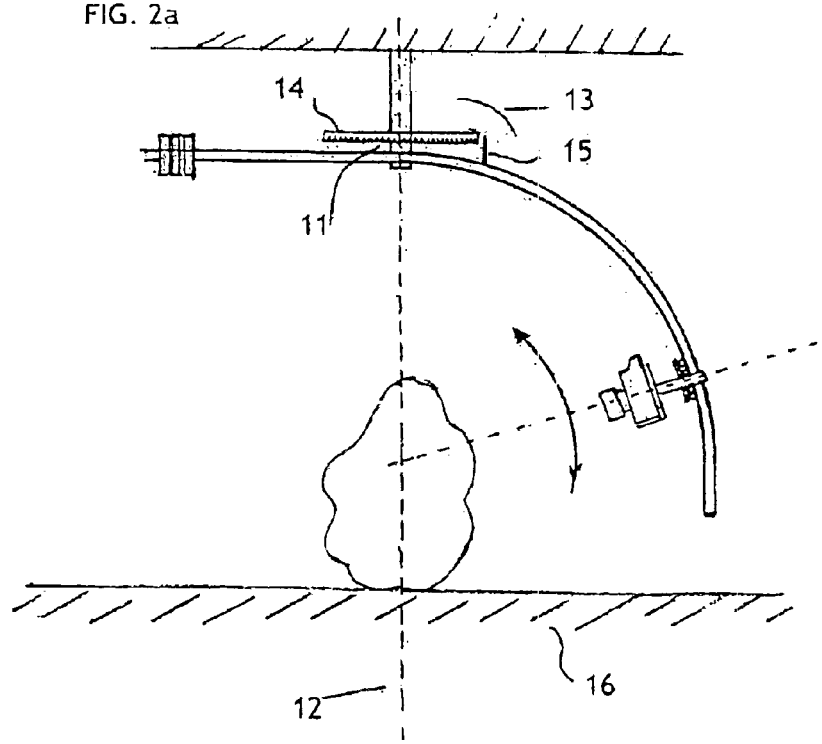
FIG. 2a shows a modified embodiment of the picture taking system according to the invention.

According to the embodiment shown in FIG. 2a, there is seen the same arrangement as that shown in FIG. 1, but here the support is provided moreover with a rotation system 11 permitting the rotation of the arm about a virtual axis 12. This rotation system is completed by an apparatus for indexing the rotation 13. This indexing mechanism is comprised by a graduated disc 14 fixed on the support and a reference mark in the form of an arrow 15 fixed on the turning arm. The system can thus turn about the photographed object 10 which is disposed on the floor 16.

Figure 2B:
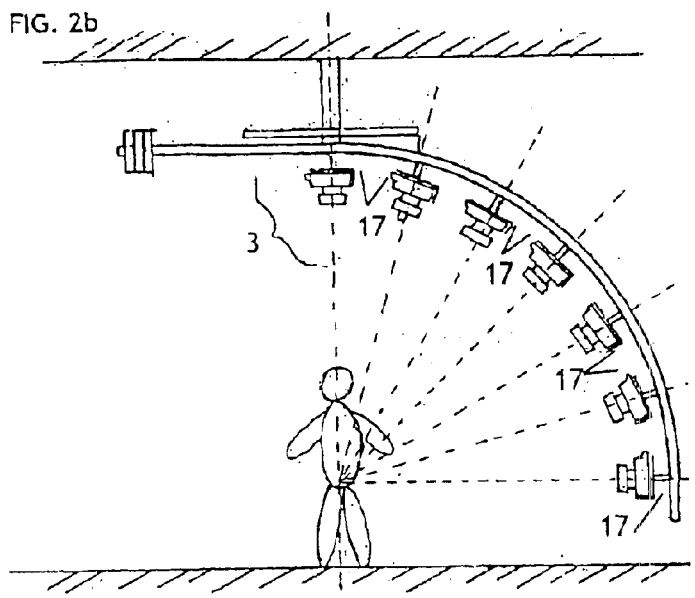
FIG. 2b shows another modification of the picture taking system.

According to the embodiment shown in FIG. 2b, there is seen the same arrangement as that shown in FIG. 2a but here, the securement system 3 is no longer an element movable along the arm but is comprised by several fixed elements 17 disposed along the arm. In this case there are seven fixed elements shown. The same as in FIG. 2a, the arm has the form of an arc of a circle covering an angular sector of 90°.

Figure 3:
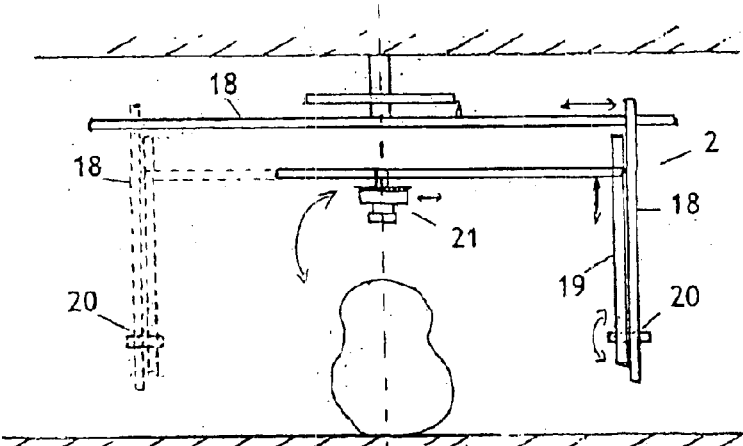
FIG. 3 shows a third modification of the picture taking system according to the invention.

According to the embodiment shown in FIG. 3, the arm 2 is comprised of two or three sections 18 and is provided with a securement system for the photographic apparatus, comprised by an oscillating arm 19, as is shown in the conventional equipment-objects. This oscillating arm pivots on one or two horizontal axles such that it can impart a movement of vertical rotation to the picture taking apparatus 21 and can position it successively at all the angles of inclination defined for a sequence of VR pictures. Here, the oscillating arm is comprised by at least two perpendicular segments such that the apparatus will be positioned such that its objective will be oriented toward the virtual axis of rotation 12 of the arm. As is also found in conventional object equipment, the radius of rotation of the picture taking apparatus can be adjusted by sliding the sections comprising the oscillating arm relative to each other.

Figure 4:
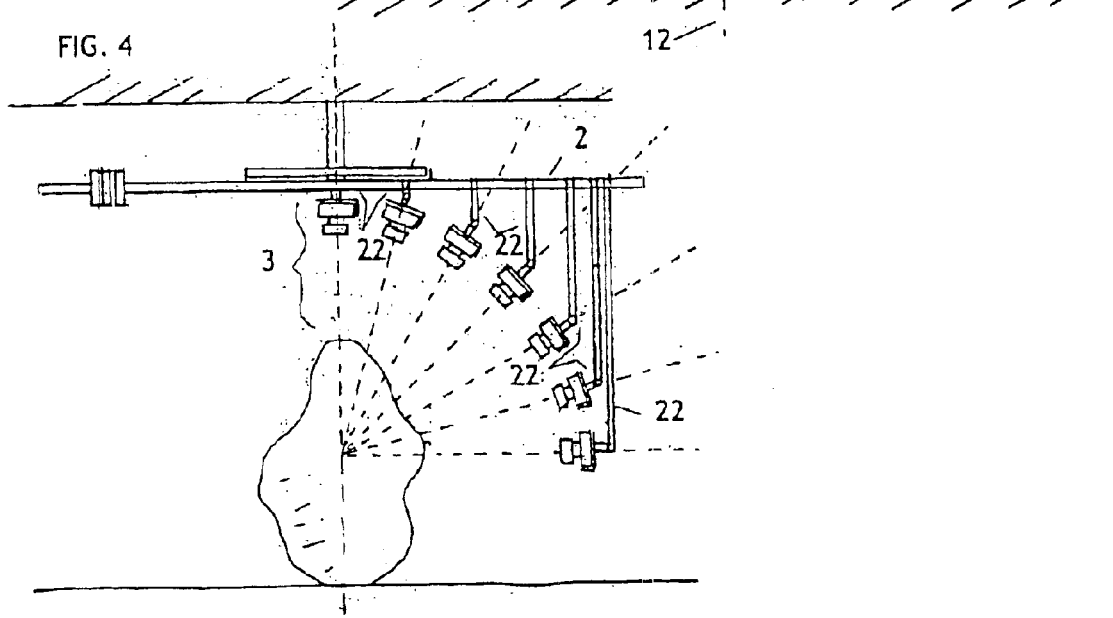
FIG. 4 shows a fourth modification of the picture taking system according to the invention.

FIG. 4 shows a possible embodiment with a straight arm 2. It will be seen that the securement system for the apparatus 3 is provided by securement tongues 22 adapted to the shape of the arm to be able to draw the arc of a circle between the nodal points of the objectives of the apparatus. Here, the tongues are articulated so as to be able to orient the objective of the apparatus according to requirements for the routine of VR picture taking.

Figure 5:
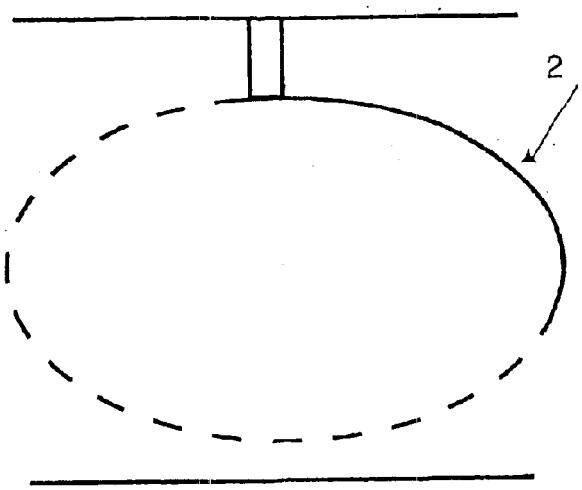
FIG. 5 shows a fifth modification of the system in which the arm is of elliptical shape.

FIG. 5 shows very schematically a system of picture taking according to the invention provided with an arm 2 of elliptical shape. As in the model provided with the straight arm shown in FIG. 4, the securement system could be comprised by articulated tongues permitting orienting the apparatus as desired.

Figure 6A:
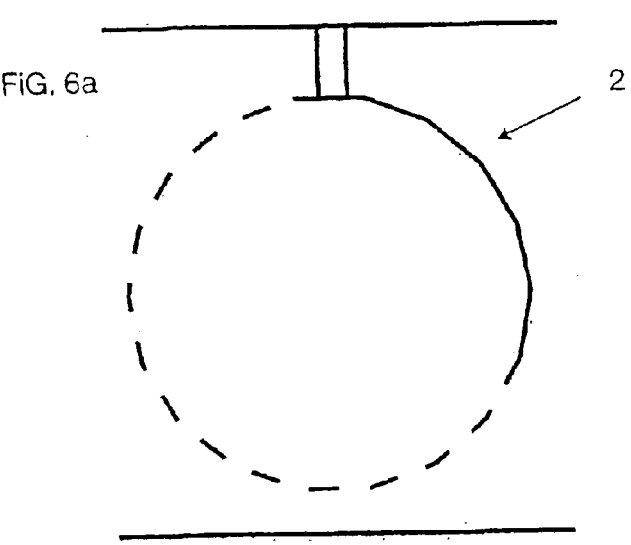
FIG. 6a shows a sixth modification of the system in which the arm is of polygonal shape.

FIG. 6a shows very schematically a system for picture taking according to the invention provided with an arm 2 of polygonal shape. Here the elements of the securement system will be disposed at the center of the segments.

Figure 6B:
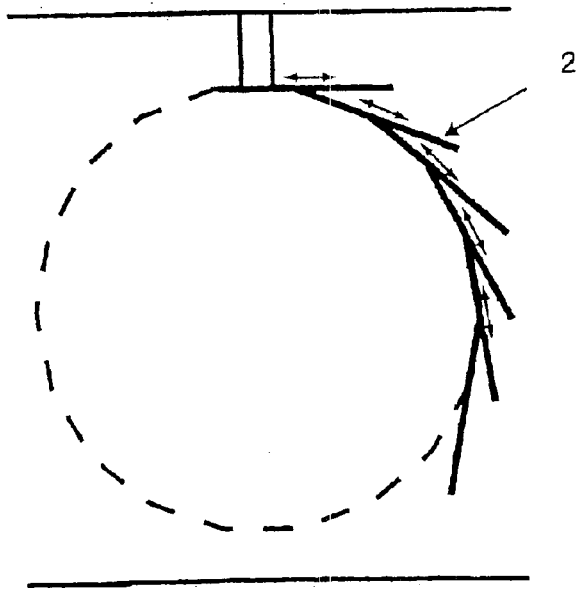
FIG. 6b shows a seventh modification of the system.

FIG. 6b shows a system for picture taking according to the invention provided with an arm 2 of changeable polygonal shape. This arm is comprised by several segments fixed to each other and sliding on each other. Thus by causing them to slide, one can modify the radius of the virtual circle covered by the arm.

The preferred embodiment of the system according to the invention is shown in an assembly view of FIG. 7 and is described in detail in the following figures.

The support 1 is articulated and is fixed to a guidance system 25. The guidance system is comprised by a carriage 26 movable on a rail 27. The rail is fixed to a beam. Here, the beam is a tubular beam of trellis work.

At the lower end of the support is located a rotation system 11. This rotation system is provided with the help of a rotatable head with notches provided with detent discs, such as can be found on the panoramic heads used in photography. This rotative head is comprised by a fixed element 28 graduated in degrees and a movable element 29 provided with an indicator.

Below the rotatable head, fixed to the movable part, is located a turning electric contact 30 (or collector) permitting supplying and connecting the apparatus fixed on the arm.

At the base of the support is located an anchoring system for the arm 31. This anchoring system for the arm is comprised by a guidance system 32. This guidance system is comprised by an anchoring carriage 33 fixed to the base of the support and a rail 34 running over the upper portion of the arm.

On the support will be anchored an arm 2. Here the arm is bent to circular shape. It is disassembleable and modulable. In this case there are three sections. A first section 35 covers a sector a bit more than a quarter of a circle. A second sector 36 prolongs this circular portion downwardly. A third sector prolongs the arm horizontally from the other side of its anchoring point along the support to form the prolongation 6.

There is a guidance system 32 on the upper portion of the arm and a guidance system 38 on the lower portion of the arm. The guidance system 32 on the upper portion is that which contributes also to the anchoring system of the arm. It is comprised by a rail 34 and moreover by the anchoring carriage, by one or several upper securement carriages 39.

The guidance system 38 on the lower portion of the arm is comprised by a rail 40 and one or several lower securement carriages 41. It is to be noted that these two guidance systems can be if desired disposed on the sides of the arm (as a function of the orientation of the curve of the rails).

The lower guidance system serves as a securement system 3 for the photographic apparatus. Each element of the securement system is comprised by a lower carriage 41 movable along the arm and is provided with a tongue 42 and a support 43 for the picture taking apparatus.

Along the arm, there is located a graduation 50 in degrees such that one can place with sufficient precision the carriages and as a result the photographic apparatus on the arm. The carriages carry a marker permitting adjusting their position relative to the graduation.

Figure 7:
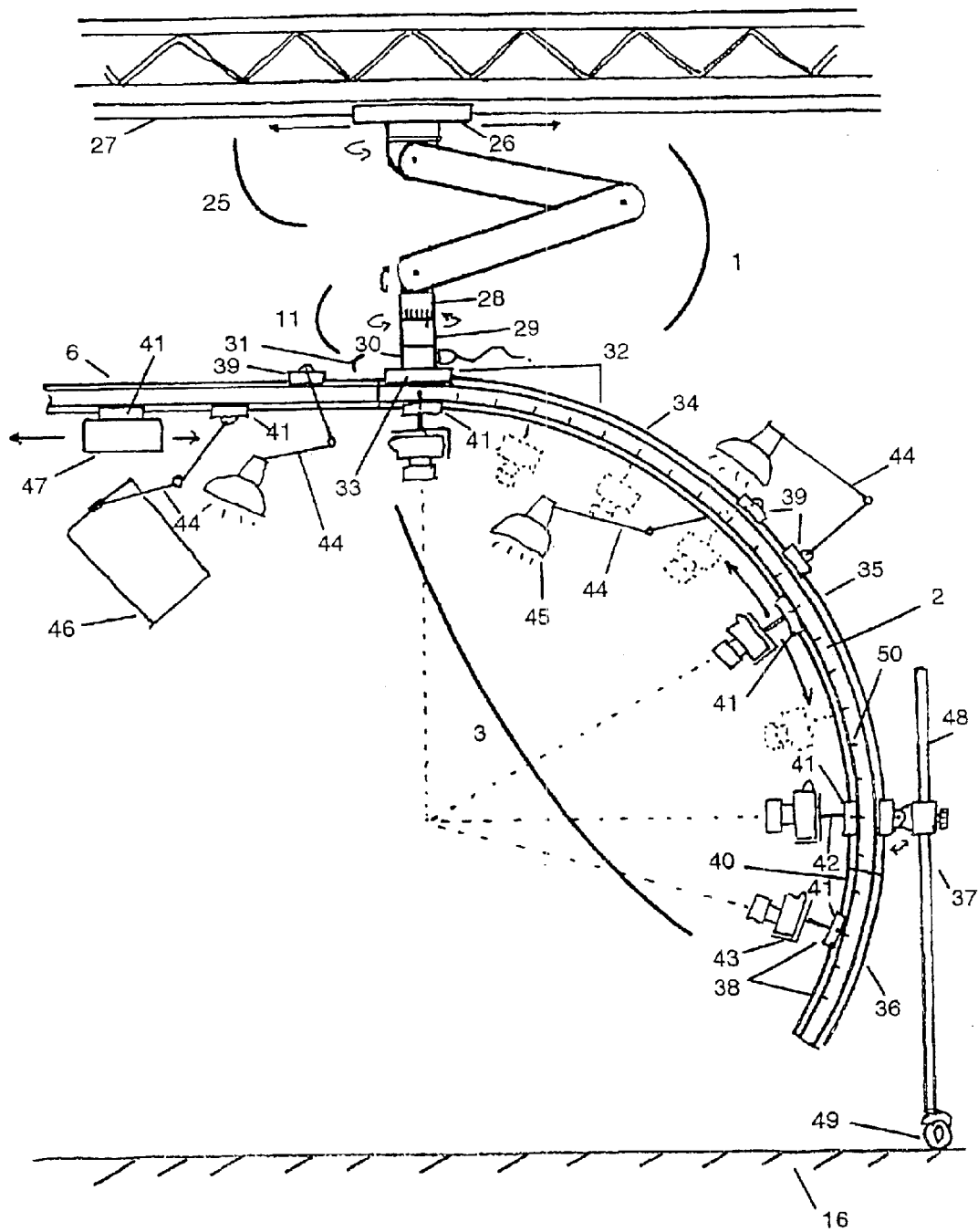
FIG. 7 shows an assembly view of the system according to the invention in its preferred embodiment.

In the configuration as shown in FIG. 7, four carriages serve to fix the extension arms 44. These extension arms are adapted to carry the devices used in photography. For example a light 45 and a reflector 46.

On the horizontal prolongation of the arm 6 is located a lower carriage provided with a counterweight 47 adapted to ensure the balancing of the system. At the point of intersection between the arm and its vertical tangent is located a carriage on which is fixed a support 37 to the floor serving also to contribute to the stability and the equilibrium of the system. This support on the floor is constituted by a rod 48 adjustable in height and at the lower end of which is located a roller 49 in contact with the floor 16.

FIG. 8 shows a detailed view of the support 3. The latter is fixed to a guidance system 25 disposed along a tubular trellis beam 5. This guidance system is comprised by a carriage 26 movable along a rail 27. Here, the support is a hydraulic articulated arm 54 which permits adjusting the position of the system from a distance. At the junction of the articulated arm with the securement carriage on the beam 26 is located a rotation system 51 which can be blocked with a locking knob 52. Similarly at the lower end of the articulated arm is located an articulation 55 permitting giving an inclination to the arm. The object of this mounting on the carriage with a rotation and articulation system is to obtain the maximum flexibility in the positioning and use of the system.

There are seen the rotatable head 53, the turning contact 30 and the anchoring carriage for the arm 33.

FIG. 9 shows the articulated arm 54 which constitutes the support operated by jacks 56.

Figure 10B:
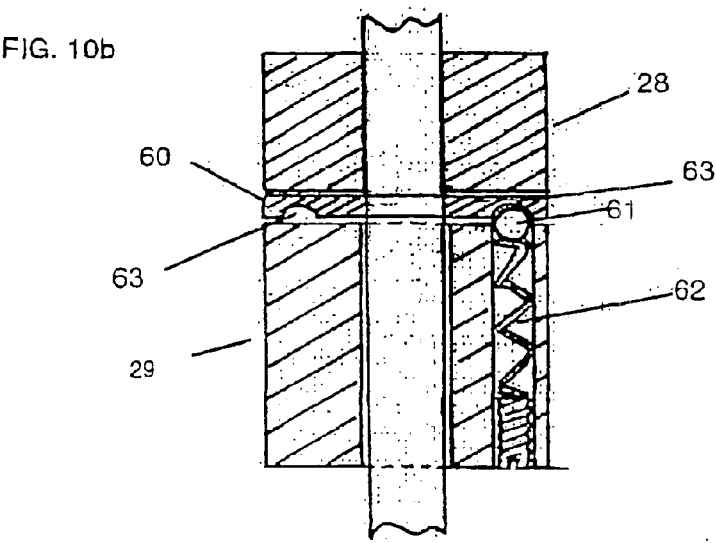
FIG. 10b shows a cross-sectional view of the rotatable head.
Figure 10C:
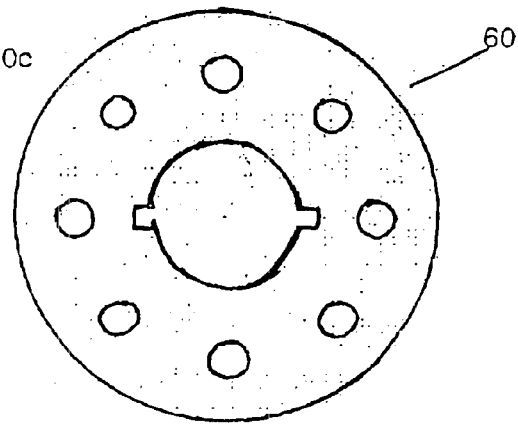
FIG. 10c shows schematically a disc with detents.

FIG. 10a shows the rotatable head 53 with a notch. The latter is comprised of an upper element fixed on the support 28 and a movable turning element 29. The disc with the detent 60 separates the two elements. FIG. 10b shows by way of example a cross-sectional view of the rotatable head. On the upper portion, there is seen the fixed element 28 connected to the axle and on the lower portion the turning element 29. A ball 61 subject to a vertical pressure of a spring 62 comes to rest in notches 63 provided on the stop disc 60. The rotatable head thus offers resistance each time the turning element has made one rotation determined by the distance between the notches on the disc with a detent such as is schematically shown in FIG. 10c. Of course, there could be provided a set of compatible discs to be able to choose the successive angle of rotation.

Figure 11:
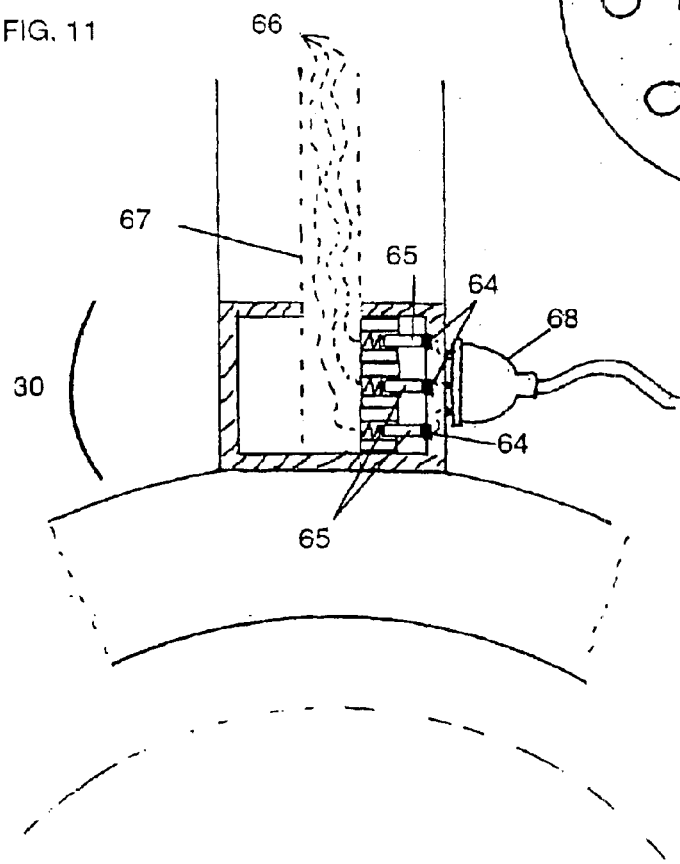
FIG. 11 shows a rotatable electrical collector or contact.

FIG. 11 shows a possible system for turning contact 30. Here it is a matter of a turning contact with three tracks 64. Three brushes 63 are disposed on the axle of rotation 67 of the system. The axle of rotation is hollow such that three supply wires 66 can supply the brushes from inside the axle. On the turning contact is inserted a plug 68 adapted to supply the electrical equipment on the axle. This turning contact is a contact with three tracks, but there can be imagined contacts turning with as many tracks as necessary both for electrical supply of the equipment and for the transfer of computer information for example.

FIG. 12 shows a cross-sectional view of the arm 2. Here, the arm is a tubular arm of square cross-section for reasons of ease of illustration. But the section could be of any other nature, the arms of circular cross-section are easier to bend. On the lower and upper portions of the arm are shown in cross-section the guide systems. These guide systems are comprised by rails 34 and 40 on which slide the carriages (in broken line) 39 and 41. As indicated, the guidance systems could as well be fixed on the sides of the arms, this is a function of the shape of the bend of the rails. (This is a solution that could be preferred because by placing the guidance system on the sides of the arms, one could use two identical guidance systems with interchangeable carriages.) Here, the carriages are shown as simple sliding elements, but as a function of the definition of the guidance system used, there could be carriages mounted on balls, rollers or needle bearings . . . .

FIG. 13 shows the anchoring of the arm 2 on the support 1 by means of an anchoring carriage 33 fixed to the support. There is also seen a securement carriage 39 disposed on the upper rail 34 and a securement carriage 41 disposed on the lower rail 40. Beyond these picture taking devices, one could fix on this securement carriage all manner of apparatus useful in photography as well as extension arms. The two are provided with a standard securement system, here a flat region 57 that can receive screws 58. There can also be imagined a system of clips. All the extensions of the system adapted to be fixed to the carriage are provided with a standard corresponding securement 59.

FIG. 14 shows an arm 2 provided with a securement system 3 comprised by a single carriage 41 movable on the lower rail 40. This type of configuration is adapted for taking pictures with a single apparatus. The carriage is moved along the arm for each angle of inclination during the picture taking sequence.

FIG. 15 shows an arm 2 provided with a securement system 3 comprised of several carriages 41 on the lower rail 40. This arrangement is applicable to a sequence of picture taking with several devices. Here the carriages have been emplaced on the rail and are not adapted to be moved during the picture taking sequence (except for trying for particular effects).

FIG. 16 shows in cross-section the juncture system of the sections 71 comprising the arm 2. The junction is made with the help of a male sleeve 69 matching the curvature of the arm and inserted in tubular segments which comprise the arm. The assembly is held by locking knobs 70. (There can also be preferred arm sections having a male sleeve side and a female sleeve side.)

Figure 17C:
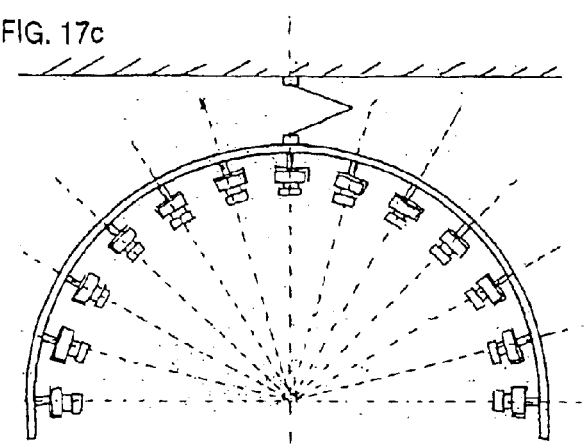
FIG. 17c shows another possible modification of the shape of the arm with the help of sections.
Figure 17D:
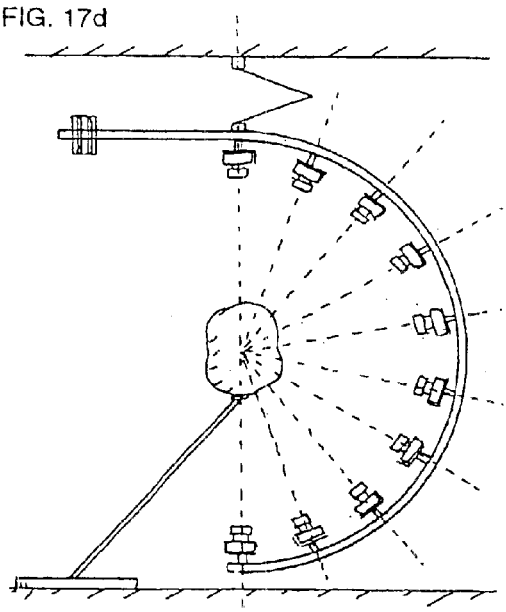
FIG. 17d shows another possible modification of the shape of the arm with the help of sections.
Figure 17E:
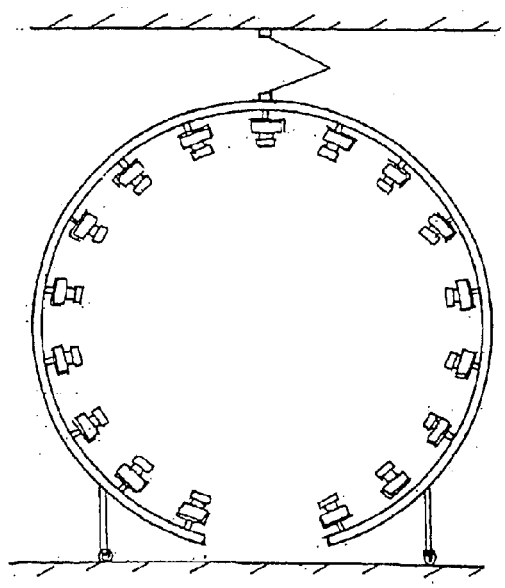
FIG. 17e shows another possible modification of the shape of the arm with the help of sections.

There is seen in FIG. 17a how the sleeve 69 matches the curvature of the arm to ensure the juncture of the sections 71 which comprise it. Thus the shape of the sector covered by the arm is adjustable with the help of sections. In FIG. 17a, a section prolongs the horizontal arm beyond its point of anchoring on the support to form the horizontal prolongation 6 and a smaller section 72 prolongs the arm at its base to extend the angular sector covered by the arm. (It is to be noted that the sleeve which ensures contact between the horizontal section and the curved portion of the arm must take into account the correction of curvature to ensure a suitable juncture.) FIGS. 17b, 17c, 17d and 17e show various examples of shapes which the arm can have with the help of the adjustable system of sections.

Figure 18:
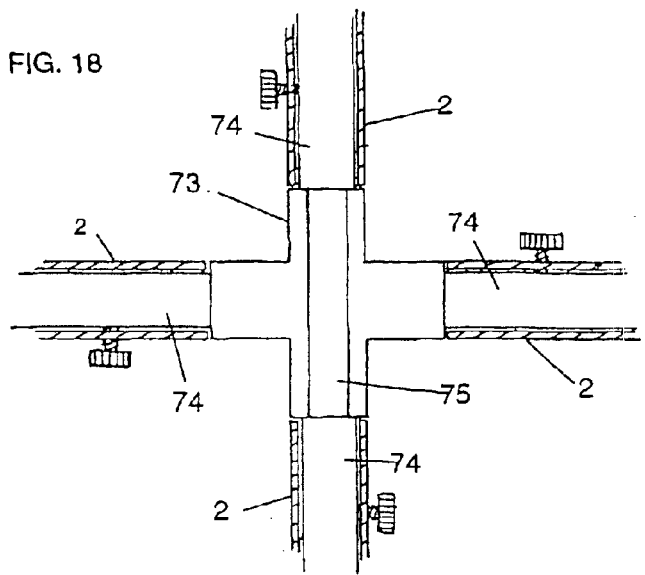
FIG. 18 shows a plan view of the star-shaped junction permitting anchoring several arms (four in this case) to the support.
Figure 19:
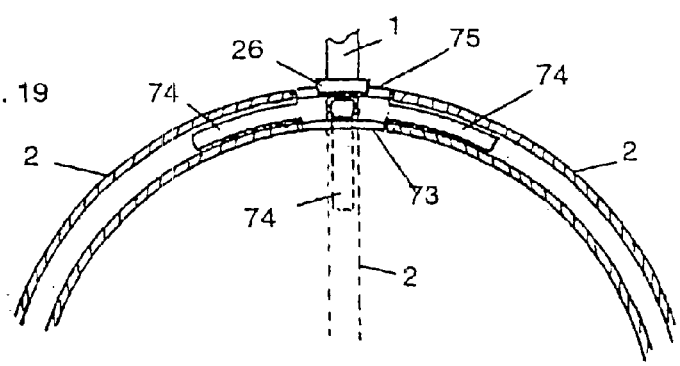
FIG. 19 shows a cross-sectional view of the star-shaped junction permitting anchoring several arms (four in this case) to the support.

In FIG. 18, there is seen a view from above of a star-shaped junction with four arms 73. This system will ensleeve four radial arms seen in cross-section at 2. There are distinguished the four male sleeves 74 which prolong the star-shaped junction 2. At the summit of the anchoring system of star shape is located an upper rail 75 on which will be fixed the anchoring carriage of the support. FIG. 19 shows the same system seen in profile cross-section. There is seen the support 1, the anchoring carriage for the support 26, the anchoring system in star shape 73, the upper rail of the anchoring system 75, the male sleeves 74 and the arms 2 seen in cross-section.

Figure 20:
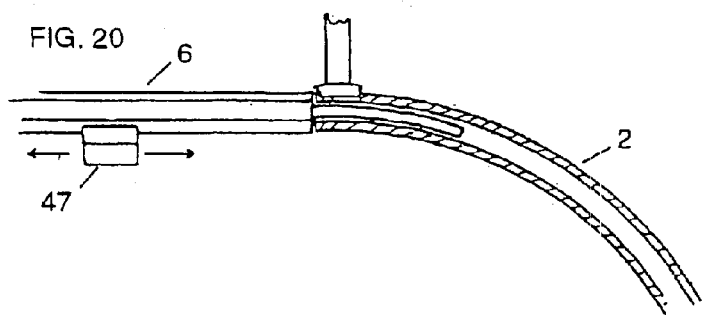
FIG. 20 shows a view in horizontal projection of the arm beyond its point of anchoring to the support.

FIG. 20 shows in detail the prolongation 6 of the arm 2 beyond the point of anchoring provided with a movable carriage carrying a counterweight 47. By moving the carriage along the prolongation, the equilibrium of the system can be adjusted.

Figure 21:
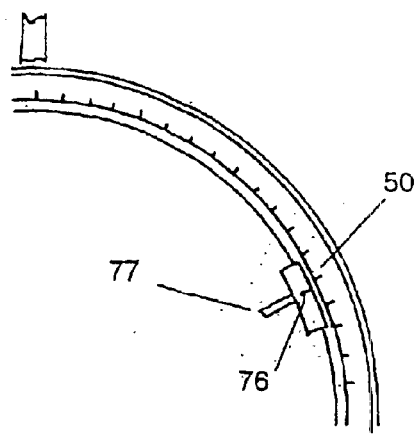
FIG. 21 shows the graduation along the arm and a carriage movable with a reference point.

FIG. 21 shows the graduation on the arm 50. It is preferred to graduate the arm in degrees. There is seen at the center of the carriage the index mark 76 permitting adjusting the position of the carriage relative to the graduation on the arm. Here, it is a matter of a carriage for securement of the picture taking apparatus provided with a tongue 77 oriented toward the center of the circle matched by the curved arm.

Figure 22:
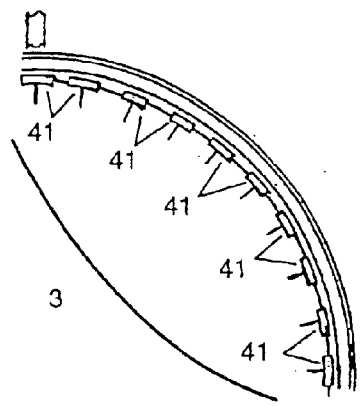
FIG. 22 shows an arm provided with a securement system adapted to use several photographic devices.
Figure 23:
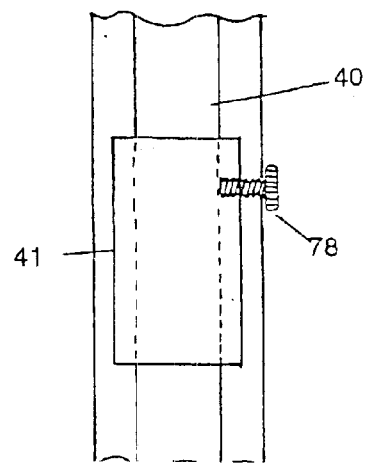
FIG. 23 shows a view of a segment of the arm with a carriage on its rail provided with a system for braking the carriage.

In FIG. 22 is shown a system for securement of picture taking apparatus 3 that can comprise as many securement carriages 41 as necessary for the flexibility sought during VR editing. For good editing conditions, there is provided a mark every ten degrees, as a result, for taking simultaneous pictures, there could be provided ten carriages to cover an angular sector of 90°.

Figure 24:
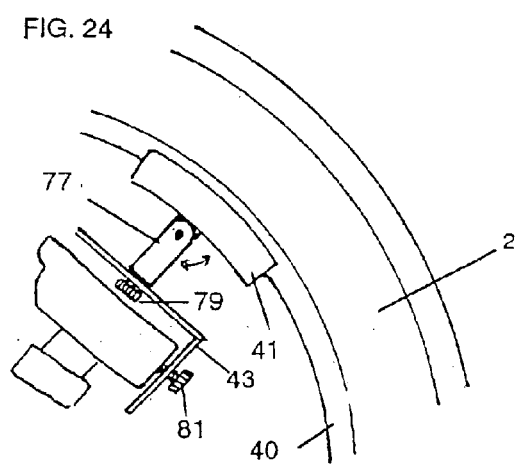
FIG. 24 show a detailed view of an element of the securement system for the photographic devices.

FIG. 24 shows in detail an element of the system for securing the apparatus. This system is comprised by a securement carriage 41 disposed on the lower rail 40 of the arm 2. From this carriage extends a tongue 77 in the radius of the circle matched by the arm. (Here this tongue is shown with an articulation, this articulation is facultative, it can be useful to take pictures of elliptical shape. One can thus adjust the orientation of the objectives of the apparatus. Similarly, it will be provided in the case in which the arm itself is not of circular shape.)

Figure 25:
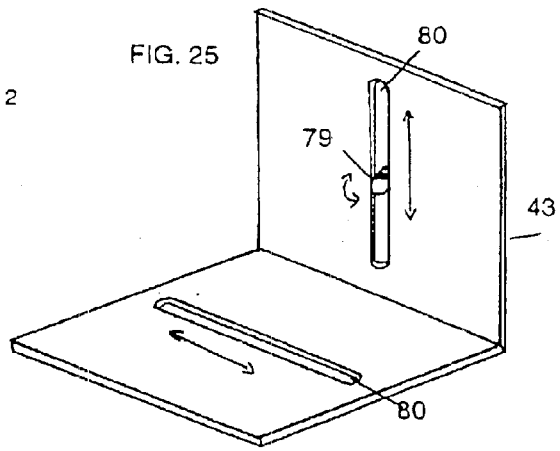
FIG. 25 shows an example of an adjustable support for the apparatus for taking pictures.
Figure 26A:
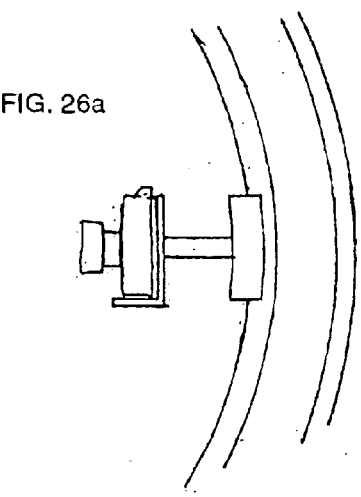
FIG. 26a shows a photographic apparatus on its support in the outdoor position.
Figure 26B:
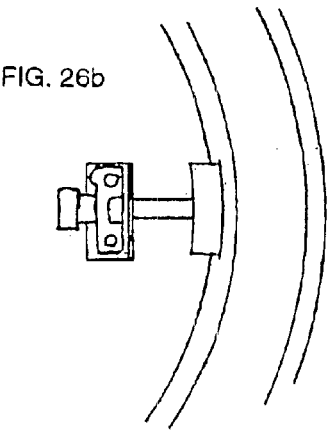
FIG. 26b shows a photographic apparatus on its support in the portrait position.

At the end of this tongue is located a securement screw 79 on which is fixed an angled support 80 to support the picture taking apparatus. The apparatus is itself fixed on the angle member with the help of a standard screw 81. The angle member is shown in perspective in FIG. 25. There are seen two slots 80 permitting adjustment of the position of the apparatus along two axes. Moreover, the angle member can pivot on a securement screw 79 such that the apparatus can freely be disposed in portrait position or landscape position. This is shown by FIG. 26a in which the apparatus is in landscape position and 26b in which the apparatus is in portrait position.

FIG. 27 show a declination of the securement system for the apparatus, comprising two parallel tongues 82 on each side of the arm 2 projecting along the radius of the circle matched by the arm, fixed on the carriage 41. This configuration permits fixing two devices for possible picture taking in relief.

FIG. 28 shows in detail the support system on the floor 37 of the arm. The latter is fixed to the arm by a securement carriage 39 disposed on the upper rail 34. The support is comprised by a rod 48 at the end of which is located a roller 49. This rod is adjustable in height by sliding in a guide 83 fixed to the carriage by means of an articulation 84. A locking screw 85 permits immobilizing the rod in its guide.

FIG. 29 shows a configuration in which the arm 2 covers at least a vertical semicircle. Here the support on the floor can be a pivot 86. This pivot could be prolonged vertically by an axle 87 passing through the arm at its base and at its intersection with a virtual axis of rotation of the system 88 to serve as an object support (object symbolized by the mass 10). As a result, the section used at the base of the arm will be pierced to let pass the vertical axle serving as a support. This type of arrangement can serve for example to present objects in suspension in their environment with little retouching of the image.

FIG. 30 shows another type of possible object support (object symbolized by the mass 10). Here, the support 89 is disposed offset from the axis of rotation of the system. The arm 2 is not totally enclosed on itself to let the support pass.

Figure 31:
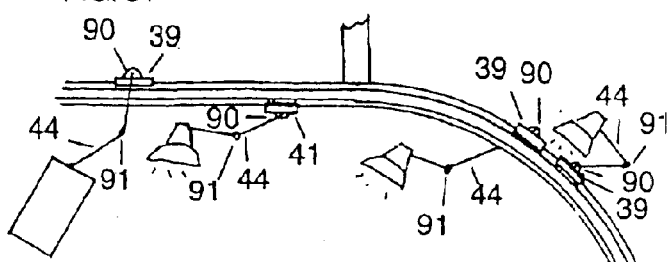
FIG. 31 shows a system provided with an articulated extension arm.

In FIG. 31 is seen securement carriages 39 and 41 disposed on the upper and lower rail provided with extension arm 44. At their base is located a securement system provided with a rotary joint 90.

These extension arms are arms articulated with the help of rotary joints 91. They serve to hold in position with great flexibility the various devices used for photography.

Figure 32:
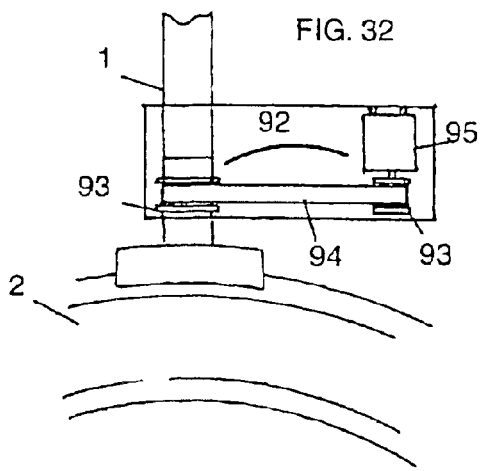
FIG. 32 shows an automatic drive system for the arm.

According to the development of the system shown in FIG. 32, the rotation of the arm 2 on the support 1 is ensured by a control system 92 comprised by two rollers 93 and a belt 94. A first roller is fixed to the support axle and the other is driven by a motor 95. This automatic control system for the system of picture taking can be controlled by electronic and computer means.

Figure 33:
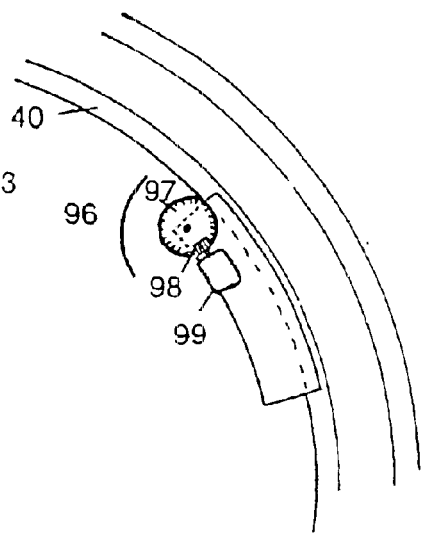
FIG. 33 shows an automatic drive system for a carriage on its rail.

According to the development of the system shown in FIG. 33, the movement of at least one securement carriage is ensured by a control system 96. This control system is integrated with the carriage, it is comprised by a roller 97 in contact with the rail 40. This roller is driven by gearing 98 moved by a motor 99 disposed on the carriage. One could for example develop this principle by using a notched wheel in the place of the roller and by selecting a rail in the form of a rack. This system has real interest only in the use of a single apparatus for picture taking, except in the case in which particular effects are sought. Also, a single carriage provided thusly can suffice for normal use of the system. If it is desired further to improve the system, a rail could be provided having electrical tracks to supply and control the carriage.

Figure 34:
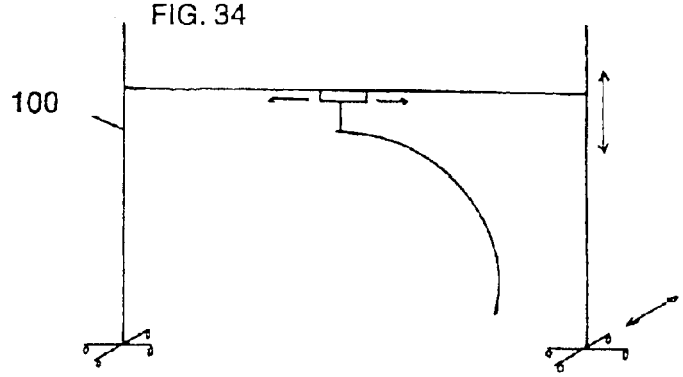
FIG. 34 shows a photographic system mounted on a movable crosspiece and adjustable in height.

The development of the system shown in FIG. 34 shows the assembly of the system held on a movable crosspiece 100 that is adjustable as to height. There will be used for example a scenery crosspiece. It is a crossbeam here, but it could also as well be a beam or a rolling bridge. The crosspiece has the advantage of having but one pillar which is appreciable for taking outside pictures, thereby correspondingly reducing the work of retouching the image to delete the pillars.

Figure 35:
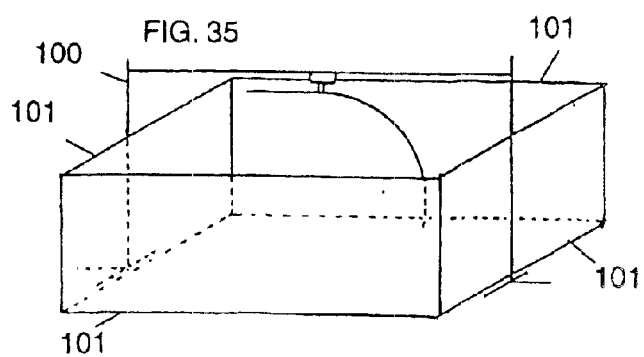
FIG. 35 shows the photographic system mounted on a crosspiece and isolated from the rest of the studio by four partitions.
Figure 36:
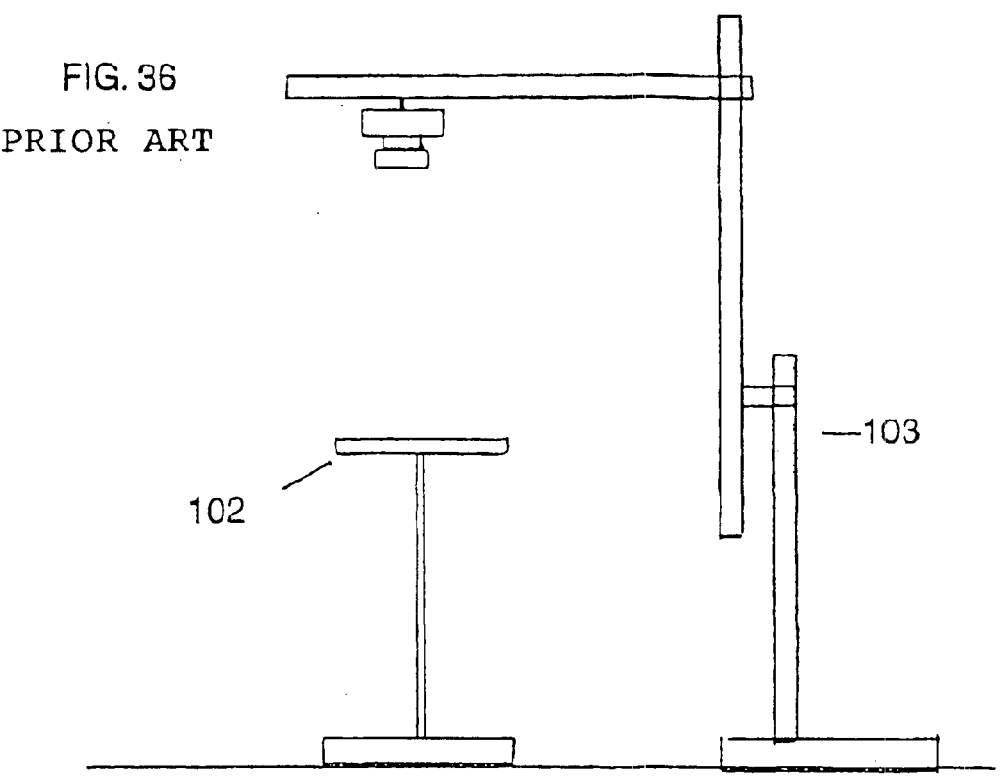
FIG. 36 shows an example of equipment according to the prior art.
Figure 37:
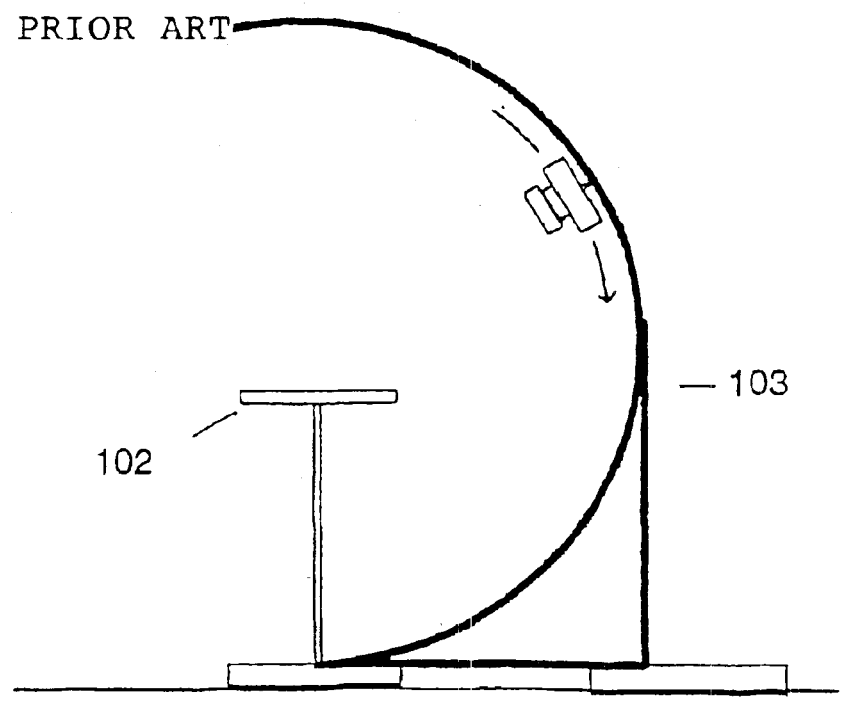
FIG. 37 shows another example of equipment according to the prior art.

The development of the system shown in FIG. 35 shows schematically a complete studio for taking pictures according to the invention. The picture taking system is fixed to a crosspiece 100 and is isolated from the rest of the studio by partitions 101. Thus the object can be placed in its decoration isolated from the rest of the studio. Here the partitions are straight, but they can be given any shape and dimension desired. For certain work in which care must be taken of the lighting, partitions of circular shape could be selected.

What is claimed is:

1. Device for taking spherical pictures of a scene comprising a support provided with securement means for picture taking apparatus, this support being adapted for movements in relative rotation about a substantially vertical axis relative to the photographed scene, the securement means being movable in rotation relative to a substantially horizontal axis, the device for taking spherical pictures further comprising suspension means permitting suspending the device for taking spherical pictures above the scene to be photographed, the support having a carrying arm having a counterweight balancing the carrying arm relative to the suspension means.

2. Device for taking spherical pictures according to claim 1, further comprising a star-shaped junction that carries several support arms.

3. Device for taking spherical pictures according to claim 1, further comprising an extension arm adapted to carry the devices used in photography.

4. Device for taking spherical pictures according to claim 1, wherein the support comprises plural disassembleable and modulable sections.

5. Device according to claim 1, wherein the securement means are mounted on an arm oscillating about a substantially horizontal axis, this arm being mounted on the support.

6. Device according to claim 1, wherein the suspension means are provided with means for varying at least one of the height and inclination of the device.

7. Device for the production of spherical pictures of a scene, comprising a support provided with securement means for several picture taking devices, the picture taking devices being adapted all to be oriented toward a point of the scene to be photographed and the support being adapted to move in relative rotation about a substantially vertical axis relative to the photographed scene, the device for the production of spherical pictures further comprising suspension means permitting suspending the device for taking spherical pictures above the scene to be photographed, the support having a carrying arm having a counterweight balancing the carrying arm relative to the suspension means.

8. Device for taking spherical pictures according to claim 7, further comprising a star-shaped junction that carries several support arms.

9. Device for taking spherical pictures according to claim 7, wherein the support comprises a prolongation on the side opposite to the side supporting the picture taking apparatus.

10. Device for taking spherical pictures according to claim 7, further comprising an extension arm adapted to carry the devices used in photography.

11. Device for taking spherical pictures according to claim 7, wherein the support comprises plural disassembleable and modulable sections.

12. Device according to claim 7, wherein the securement means are mounted on an arm oscillating about a substantially horizontal axis, this arm being mounted on the support.

13. Device according to claim 7, wherein the suspension means are provided with means for varying at least one of the height and inclination of the device.

14. Device for taking spherical pictures of a scene comprising a first support provided with securement means for picture taking apparatus, this first support being adapted for movements in relative rotation about a substantially vertical axis relative to the photographed scene, the securement means being movable in rotation relative to a substantially horizontal axis, the device for taking spherical pictures further comprising suspension means permitting suspending the device for taking spherical pictures above the scene to be photographed, the first support connected to a second support acting on the floor.

15. Device for taking spherical pictures according to claim 14, further comprising a star-shaped junction that carries several support arms.

16. Device for taking spherical pictures according to claim 14, further comprising an extension arm adapted to carry the devices used in photography.

17. Device for taking spherical pictures according to claim 14, wherein the first support comprises plural disassembleable and modulable sections.

18. Device according to claim 14, wherein the securement means are mounted on an arm oscillating about a substantially horizontal axis, this arm being mounted on the support.

19. Device according to claim 14, wherein the suspension means are provided with means for varying the height and/or inclination of the device.

20. Device for the production of spherical pictures of a scene, comprising a first support provided with securement means for several picture taking devices, the picture taking devices being adapted all to be oriented toward a point of the scene to be photographed and the support being adapted to move in relative rotation about a substantially vertical axis relative to the photographed scene, the device for the production of spherical pictures further comprising suspension means permitting suspending the device for taking spherical pictures above the scene to be photographed, the first support connected to a second support acting on the floor.

21. Device for taking spherical pictures according to claim 20, further comprising a star-shaped junction that carries several support arms.

22. Device for taking spherical pictures according to claim 20, wherein the first support comprises a prolongation on the side opposite to the side supporting the picture taking apparatus.

23. Device for taking spherical pictures according to claim 20, further comprising an extension arm adapted to carry the devices used in photography.

24. Device for taking spherical pictures according to claim 20, wherein the first support comprises plural disassembleable and modulable sections.

25. Device according to claim 20, wherein the securement means are mounted on an arm oscillating about a substantially horizontal axis, this arm being mounted on the support.

26. Device according to claim 20, wherein the suspension means are provided with means for varying at least one of the height and inclination of the device.

\* \* \* \* \*